US010860903B2

(12) United States Patent
Waquet et al.

(10) Patent No.: US 10,860,903 B2
(45) Date of Patent: Dec. 8, 2020

(54) AUTOMATIC GENERATION OF AN ANIMATED IMAGE FOR THE PRINTING THEREOF ON A LENTICULAR SUPPORT

(71) Applicants: ALOA, INC., New York, NY (US); POPS FRANCE, Saint-Mandé (FR)

(72) Inventors: Xavier Waquet, Paris (FR); David Dernoncourt, Paris (FR); Yoann Gendrey, Amiens (FR)

(73) Assignees: ALOA, INC., New York, NY (US); POPS FRANCE, Saint-Mandé (FR)

( * ) Notice: Subject to any disclaimer, the term of this patent is extended or adjusted under 35 U.S.C. 154(b) by 0 days.

(21) Appl. No.: 16/496,042

(22) PCT Filed: Mar. 21, 2018

(86) PCT No.: PCT/EP2018/057120
§ 371 (c)(1),
(2) Date: Sep. 20, 2019

(87) PCT Pub. No.: WO2018/172395
PCT Pub. Date: Sep. 27, 2018

(65) Prior Publication Data
US 2020/0026971 A1 Jan. 23, 2020

(30) Foreign Application Priority Data

Mar. 22, 2017 (FR) .................................. 17 52377

(51) Int. Cl.
*G06K 15/02* (2006.01)
*G02B 3/00* (2006.01)
*G02B 27/06* (2006.01)
(52) U.S. Cl.
CPC ........... *G06K 15/024* (2013.01); *G02B 3/005* (2013.01); *G02B 27/06* (2013.01); *G06K 15/181* (2013.01);
(Continued)

(58) Field of Classification Search
CPC ............... G06K 15/024; G06K 15/181; G06K 15/1825; G06K 15/1843; G06K 15/1856; G02B 3/005; G02B 27/06
See application file for complete search history.

(56) References Cited

U.S. PATENT DOCUMENTS

2010/0098340 A1* 4/2010 Zomet .................... H04N 1/387
382/206

FOREIGN PATENT DOCUMENTS

WO  WO 02/063560 A2  8/2002
WO  WO 2008/087632 A2  7/2008

OTHER PUBLICATIONS

International Search Report as issued in International Patent Application No. PCT/EP2018/057120, dated Jun. 11, 2018.

* cited by examiner

*Primary Examiner* — Moustapha Diaby
(74) *Attorney, Agent, or Firm* — Pillsbury Winthrop Shaw Pittman LLP (57) ABSTRACT

The method for generating a final image for the printing thereof on a lenticular support includes an acquisition of a first file including a plurality of images; an automatic extraction of a determined number of images of the first file as a function of a maximum number of images to extract, the images being ordered according to a first order; a redimensioning of the images as a function of a parameter of density of lenses per unit surface area of a predefined printable support, called the pitch; an interlacing of the extracted images; and a generation of a final image to be printed on a lenticular support.

17 Claims, 2 Drawing Sheets (52) U.S. Cl.
CPC ..... *G06K 15/1825* (2013.01); *G06K 15/1843* (2013.01); *G06K 15/1856* (2013.01)

AUTOMATIC GENERATION OF AN ANIMATED IMAGE FOR THE PRINTING THEREOF ON A LENTICULAR SUPPORT

CROSS REFERENCE TO RELATED APPLICATIONS

This application is the U.S. National Stage of PCT/EP2018/057120, filed Mar. 21, 2018, which in turn claims priority to French Patent Application No. 1752377 filed Mar. 22, 2017, the entire contents of all applications are incorporated herein by reference in their entireties.

FIELD

The field of the invention relates to the field of printing on a lenticular support. More specifically, the field of the invention pertains to methods making it possible to generate an image for printing on a lenticular support.

PRIOR ART

At present, solutions exist making it possible to print an image on a lenticular support. The printed image may result from an operation of interlacing of images, generally two, to make it possible to produce a visual effect, such as a movement of the printed image.

The operation of printing on a lenticular support is delicate since it is necessary to take account of a parameter of density of lenses on the printing support and a printing resolution. Consequently, the interlacing of images is carried out on a case by case basis according to the printing support and the input images to print. Usually, an important drop off rate is observed, a single shift of a pixel line during the processing of images being able to generate an image of which the printing will no longer produce the desired effect.

Furthermore, there exists a need to produce animated images on a lenticular support at the industrial scale taking into account a number of images that can vary and coming from a large number of different files. Yet current techniques of processing images combined with the precautions of configurations required on account of the type of printing on a lenticular support do not make it possible to meet this need.

SUMMARY OF THE INVENTION

The invention aims to overcome the aforesaid drawbacks.

According to an aspect, the invention relates to a method for generating a final image for the printing thereof on a lenticular support comprising:

An acquisition of a first file comprising a plurality of images;
An automatic extraction of a determined number of images of the first file as a function of a maximum number of images to extract, said images being ordered according to a first order;
A redimensioning of the images as a function of a parameter of density of lenses per unit surface area of the lenticular support, called the pitch, and the dimensions of the lenticular support;
A periodical interlacing generating an image formed of an alternation of segments of pixels coming from the extracted images of the first file;
A generation of a final image to be printed on a lenticular support.

An advantage is to make it possible to carry out automatically a large number of single printings on different lenticular supports while taking into account parameters specific to each user such as the number of images to print.

According to an aspect, the invention relates to a method for generating a plurality of final images for the printing thereof on at least one lenticular support comprising:

A plurality of receptions of first files, each first file comprising a given format, size and number of images, each first file further being associated with a user and a given printing configuration.

In this case the steps of extraction, redimensioning and interlacing are carried out for each first file.

Still in this case, the method includes an automatic generation of as many final images as first files received in order to be each printed on at least one lenticular support.

An advantage is to make it possible to process simultaneously a plurality of files.

According to an embodiment, the method makes it possible to transfer at least one file comprising the different user configurations relative to the different files $F_1$ that he wishes to process by means of the method of the invention. According to a case, a configuration file includes each configuration of each file and is transmitted to a server. According to another case, several configuration files are transmitted to a server. The configuration includes a maximum number of images to extract NIEmax, of image dimensions comprising sizes and ratio. A server is then able to address the different files to the different printing resources, printers, according to the hardware configurations associated with each file $F_1$. The hardware configurations notably include the dimensions of the support, the printing resolution, the pitch. According to an example, the printer is determined as a function of the $NIE_{max}$ of a file that is in adequation with the hardware configuration of the printer.

According to an embodiment, the printing configuration comprises at least one of the elements among the following list:

A value of a number of images to extract selected by a user or a type of format of the first file automatically inducing a predefined number of images to extract;
a density of lenses per unit surface area of the lenticular support and/or;
a density of printing of points per unit of length and/or;
dimensions, comprising at least a size and a proportion, of the support chosen for the printing.

According to an embodiment, the $NIE_{max}$ is deduced from the first configuration.

According to an embodiment, the method for generating a final image for the printing thereof on a lenticular support comprising:

A first acquisition of a first file comprising a plurality of images;
A second acquisition of a second file comprising a plurality of images;
An automatic extraction of a first determined number of images of the first file as a function of a maximum number of images to extract;
An automatic extraction of a second determined number of images of the second file as a function of a maximum number of images to extract,
the first and second numbers being different,
the method further comprising, for each extracted image of the first and the second file:

A redimensioning of the images as a function of a parameter of density of lenses per unit surface area of the lenticular support, called the pitch, and the dimensions of the lenticular support;

A periodical interlacing generating an image formed of an alternation of segments of pixels coming from extracted images of the first file;

A generation of a final image to be printed on a lenticular support.

An advantage is to process automatically the files of different types and of which the number of images to process is different between several users.

According to an embodiment, the first file comprising a plurality of images is a file among the following list:
a video file of a known duration;
a file in .gif format;
a file of animated images of LivePhoto type;
a video file of Boomerang type;
a set of images.

An advantage is to make it possible to take into account a large number of different formats. Indeed, the method enables the dynamic extraction of a plurality of photos in order to generate an image being able to be animated on a printing support.

According to an embodiment, when at least one file $F_1$ is a video file, the method comprises the generation of an extract of a portion of the video less than 2 s and an automatic extraction of said portion of a number of images corresponding to the value of the maximum number of images to extract ($NIE_{max}$).

According to an embodiment:
a plurality of acquisitions of first files is carried out simultaneously and;
the steps of extraction, redimensioning and interlacing are carried out for each of the first files acquired in an independent manner.

An advantage is to make it possible to process a volume of images downloaded by a plurality of users.

According to an embodiment, the method includes an operation of computing the volume of data to process or the number of files received so as to allocate dynamically the computing resources necessary to process a plurality of first files simultaneously.

An advantage is to make it possible to enable the downloading in parallel of several files $F_1$ and to enable the processing in parallel by means of allocated computing resources of different files $F_1$. Thus, an advantage of the invention is to make it possible to process several hundred, or even thousands or hundreds of thousands of files in parallel while taking into account specific user preferences for each file $F_1$.

According to an embodiment, the method of the invention includes means for automatically processing a predefined number of files $F_1$ within a predefined time lapse.

According to an embodiment, the method includes a generation of a printing indicator in order to group together first files received having a same number of extracted images to be printed on a same support of greater dimension than that of the printed image, a cutting step being carried out in order to generate the final image.

According to an embodiment, the method includes a generation of a printing indicator in order to group together the first files received having a same user identifier.

According to an embodiment, the extraction of the images of the first file includes the association with each image of an identifier comprising a datum specific to the order of the image in a sequence formed of the set of extracted images.

An advantage is to use the order of the images in the sequence to restore an animation of the images faithful to the animation of the images of a first file.

According to an embodiment, the maximum number of images to extract $NIE_{max}$ is determined as a function of:
a parameter of density of lenses per unit surface area or length, noted the pitch, and;
the printing resolution.

An advantage is to guarantee that the totality of processed first files, independently of their format, ends in the generation of an appreciable animation according to a change of viewing angle of the printed support.

According to an embodiment, the first type of video format is a format comprising a predefined duration.

According to an embodiment, the extraction selects a sample of images of the first file of which the distribution is evenly distributed among the set of images of the first file.

An advantage is to conserve a fluidity of movement of the animation and a faithfulness of the movement of the animation of the images of the first file.

According to an embodiment, the format and the dimensions of each image are automatically homogenised with each other as a function of at least one predefined criterion.

According to an embodiment, the redimensioning generates a new image as a function of the number of images to interlace.

An advantage is to optimise the computations during the interlacing of the images.

According to an embodiment, the redimensioning of the images generates a width and/or a height of each image of the set of extracted images such that it corresponds to the dimensions of the lenticular support, the density of the redimensioned images being computed to correspond to a multiple of the pitch.

An advantage is to adjust the size of the final images so that they are compatible with preconfigured support sizes. Which further makes it possible to make the method independent of a given printer.

According to an embodiment, the image generated by the interlacing is formed of an ordering of groups of segments selected among each image coming from the set ENS1, each segment of a group corresponding to a line or to a column of an extracted image of the first file, the segments being ordered into a group by alternation of segments selected in different images and juxtaposed with respect to each other according to the first order, said groups being juxtaposed one after the other in a periodical manner.

According to an embodiment, segments of each image are arranged periodically with a period corresponding to the number of extracted images of the first file, the other not extracted pixels not being processed by the method of the invention to generate the final image.

An advantage is to ensure the visual effect of reconstitution of an image printed on a lenticular support for a given viewing angle.

According to an embodiment, the groups are arranged with respect to each other according to a second order which is defined by an increasing or decreasing sense of the selected segments of an extracted image of the first file.

According to an embodiment, the segments are selected by means of:
a step of extraction of segments of each image, said segments being extracted according to a position specific to a given image and with a same periodicity for all the images between each extracted segment of a same image; or,
a step comprising the application of a mask of same size as the image and comprising strips making it possible to conserve the pixel lines or columns of each image and to eliminate the colours of the pixels of masked columns or lines, the mask being applied to each image with a shift of the width of a segment; or, a step of image processing aiming to conserve certain pixels in their original colour and to make other pixels transparent in the image, said processing being carried out by the generation of rectangles arranged periodically in the image to process and of which the dimensions are a function of the size of the images to process and the number of image to process NIE, the rectangles being shifted by a pixel during the processing of a next image to process coming from the extracted images.

According to an embodiment, the interlaced image is redimensioned as a function of the printing resolution.

An advantage is to ensure an optimal printing that is faithful to the interlacing of the lines or columns of pixels within each lens.

According to an embodiment, the method includes:

Either a generation of a plurality of mirror images after the extraction of images of the first file;

Or a generation of a mirror image of the interlaced or redimensioned image.

According to another aspect, the invention relates to a computer programme product directly chargeable in the internal memory of a digital device, including software code portions for the execution of the steps of the method of the invention when said programme is executed on a digital device.

According to an embodiment, the digital device is a PC, a server or a mobile terminal.

According to another aspect, the invention relates to a lenticular paper on which is printed an image according to the method of the invention. According to an embodiment, the printing is on the back of the lenticular sheet. According to an embodiment, the lenticular paper includes an adhesive on the front of the face showing a visible image. The adhesive is arranged consecutively to the printing.

An advantage is to define formats of image to print while taking into account different wishes of a plurality of users and different formats and sizes of images.

According to an embodiment, a digital code is printed either on the front of the image or on the back while being integrated in the image during the interlacing step, said digital code comprising an identification datum. According to another aspect, the invention relates to a device for the implementation of the method of the invention, including a memory for recording the extracted images and a calculator making it possible to carry out at least the steps of redimensioning and interlacing the processed images.

An advantage is to automate a method which can be personalised as a function of user wishes, a type of lenticular paper, the number of images to process, etc.

An advantage is to eliminate the steps of manual or visual validation carried out by a human for each file of images to process.

According to an embodiment, the device includes storage and computing resources adaptable to a volume of data of first files acquired within a given time lapse.

An advantage is to offer capacities for processing a large number of files in a simultaneous manner and/or in an independent manner.

BRIEF DESCRIPTION OF THE FIGURES

Other characteristics and advantages of the invention will become clearer from reading the detailed description that follows, with reference to the appended figures, which illustrate.

DESCRIPTION

Figure 1:
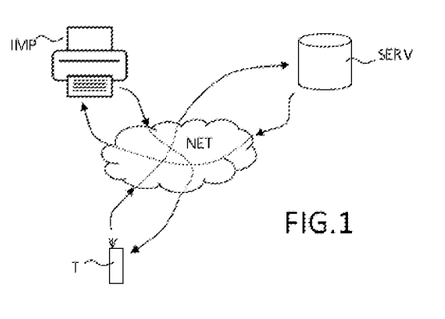
FIG. 1: an example of architecture making it possible to implement the method of the invention.

FIG. 1 represents a user terminal noted T comprising at least a memory and a calculator. In an embodiment, the first memory comprises a first file $F_1$, such as a video file that the user is able to upload to a server SERV through a data network such as the internet network.

The first file $F_1$ is received by the server SERV and recorded in a second memory of the method.

In this case, the method of the invention starts with the reception of the first file $F_1$ by the server SERV in order to generate a final digital image IF and possibly an image to be printed on a lenticular support.

According to another embodiment, the computing means are distributed on a plurality of servers, the processings of the method of the invention are then recompiled in a final step to generate a final image IF and/or an image to print. As an example, the steps of extraction of the images, of redimensioning for the interlacing and of interlacing itself of the images may be carried out by a first server. The steps of redimensioning for the printing, the step of turning over the image and the generation of the image to print may be, for their part, carried out by a second server. In this embodiment, the steps of FIG. 2 could be carried out by the first server and the steps of FIG. 3 could be carried out by a second server. Other distribution configurations are possible.

According to another embodiment, the method of the invention is executed locally on a terminal T of a user such as a PC, a tablet or a smartphone. In the latter case, the terminal T includes at least one calculator enabling the implementation of the steps of the method. To this end, the user may have downloaded beforehand an application, such as an executable code that will be capable of processing the different steps of the method. In this case, ideally, the user is able to connect his terminal T to a printer IMP making it possible to print the final image IF on a predefined lenticular paper.

According to another alternative, the user uploads the final file IF obtained by the method of the invention to another entity connected to a printer IMP to carry out the printing step.

Figure 2:
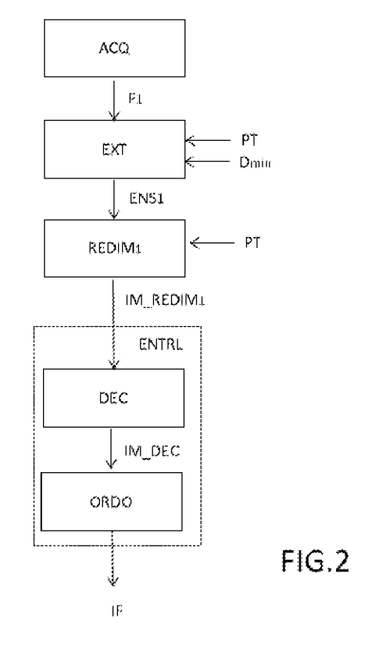
FIG. 2: the main steps of the method of the invention making it possible to generate a final image.

FIG. 2 represents the main steps of an embodiment of the method of the invention.

Acquisition of the First File

The method comprises a first step of acquisition, noted ACQ, of a first file $F_1$. The first file $F_1$ is a digital file that includes data corresponding to digital images.

According to a first alternative embodiment, the first file $F_1$ is a video file, for example, in Mpeg or Avi format. It may be a video of Boomerang type or of a particular type.

According to a second alternative, the first file is a set of images being able to be in the same format and/or in the same dimensions or may correspond to different dimensions or different formats.

According to a third alternative embodiment, the first file is a Gif type digital image format.

According to a fourth alternative embodiment, the first file is an animated image, for example of LivePhoto type.

The first file $F_1$ is initially stored on a first memory, for example of a server or a user terminal, such as a smartphone, a digital tablet or a PC. A first command of a user makes it possible to upload the file to a second memory to be processed by the method of the invention by means of a calculator.

According to an embodiment, the device of the invention that carries out the acquisition of the images includes computing means and storage resources adaptable to the volume of data received corresponding to the first files $F_1$. Indeed, according to an embodiment, the method of the invention includes a plurality of acquisitions of a first file $F_1$. These acquisitions may be carried out simultaneously and in an independent manner. The method makes it possible to receive the first file $F_1$ and to record it in one or more memories. Thus, a computing resource may be configured to detect the volume of data received within a time lapse and to allocate a processing resource and a memory making it possible to ensure the acquisition of the set of first files $F_1$.

In this embodiment, the steps of the method that succeed the acquisitions of the files $F_1$, such as the steps of extraction, redimensioning and interlacing, are carried out for each of the first files $F_1$ acquired in an independent manner. The steps may possibly be carried out simultaneously for each first file $F_1$ received in so far as the hardware resources are reserved for the need to carry out these processings in parallel.

According to an embodiment, each first file $F_1$ may be processed instantaneously at its arrival on the server by implementing for example the scalability of a service such as that of Amazon Web Services, better known by the acronym AWS. When the processing is carried out by AWS via the so-called "serverless" technology, it is possible to adapt the resource necessary to process a large volume of the first file $F_1$.

Extraction of the Images of the First File According to an embodiment, the method of the invention comprises a step of extraction EXT of images of the first file $F_1$. This step advantageously comprises the control of a digital parameter called "number of images to extract" NIE.

According to an embodiment, the NIE is predetermined and comprises a set value.

According to another embodiment, the NIE is computed automatically as a function of several criteria.

According to a first alternative a criterion for computing the NIE depends on the nature of the first file $F_1$. When the first file $F_1$ comprises a series of images, for example downloaded by a user. The number of images of the file NIF is compared to a maximum value of extractable images $NIE_{max}$. If the number of images of the file NIF is less than $NIE_{max}$, then the number of image to extract NIE is that of the number of images of the file NIF. If the number of images of the file NIF is greater than $NIE_{max}$, then the number of images to extract NIE results from a choice of a number $NIE_{max}$ of images among the number of images of the file NIF. The choice may be automatically guided by a sampling algorithm taking into account a homogeneous distribution of the photos extracted from the number of images of the file NIF. For example, if NIE=8 and NIF=16, the method will make it possible to take into account one image out of two among the images of the first file $F_1$.

According to a second alternative, the computation of the NIE includes beforehand a computation of the $NIE_{max}$ which may depend, for example, on a chosen printing configuration. The latter printing configuration can take into account, for example, a printing resolution and/or a format of first file $F_1$ and/or a parameter relative to the density of lenses of a given lenticular paper, noted the pitch.

The pitch may be defined per unit surface area or per unit of length in the present invention given that the images are segmented by line and by column of pixels to produce a movement effect. The invention mainly refers to a distribution of a number of pixels per lens, consequently, the density of lenses is indiscriminately expressed per unit surface area or per unit of length.

According to an exemplary embodiment, it is possible to define the maximum number of images to extract $NIE_{max}$ thus:

$$NIE_{max}=E[D/\text{Pitch}],$$

with D: the density of printing of points per unit of length, for example per inch or cm. Through misuse of language the density can be defined per unit surface area, in this latter case the surface is normalised for a line;

with E: the entire part.

D designates the printing resolution. It is a parameter specific to the printer. The printing resolution may be defined as the density of points printed per unit surface area.

In the example of the Boomerang type video, the first file $F_1$ comprises 10 different images. If $NIE_{max}=8$ on account of the printing parameters and the pitch, then the number of images to extract NIE must be less than or equal to 8. The method of the invention makes it possible to take into account parameters defining a compromise such as for example:

the best distribution of the images to extract to be faithful to the original animation;

the quality, that is to say, the resolution of the interlaced images that will be printed;

the quality of the animation.

In the example of a Boomerang type video, the method of the invention extracts 5 photos of the file $F_1$ which makes it possible to extract one image out of two and to obtain a dynamic animation faithful to the original video. This extraction makes it possible to define a compromise resolution of animated image/quality of the animation which suits predefined criteria.

As an example, certain parameters may be prioritised according to the method of the invention as in the Boomerang example: the regular sampling of images. According to other exemplary embodiments, the dominant criterion may be the quality of the images. This case may arise if the quality of the acquired images is not sufficient. Finally, another criterion may be to favour an animation quality while ensuring an extraction of a minimum of photos of the file $F_1$.

The extracted images are numbered so as to define a sequence SEQ1 of images ordered according to a first order ORD1. This characteristic makes it possible to conserve an animation effect when the images will be interlaced by the method of the invention. Indeed, the method of the invention makes it possible to conserve the order of sequence SEQ1 of the images in the arrangement of the different segments of images coming from the different images.

Redimensioning of the Images: Homogenisation of the Format and the Size

The extracted images form a sequence SEQ1 and define a set of images to process $ENS_1$. The method of the invention includes a first redimensioning $REDIM_1$ which aims to:

homogenise the formats of each image in a determined format;

homogenise the dimensions of each image to generate all the images of the set in the same dimensions.

An image is defined by different parameters, of which:
its density of pixels per inch or cm: $D_{im}$
its size Ta, expressed in inches or cm and which corresponds at least to a height H and to a width L or a proportion parameter linking the height and the width.

If P is the number of pixels of the image, $P=D_{im} \times Ta$.

According to an embodiment, the format chosen may be defined by an instruction of a user, for example, from a selection of a format from a list of predefined formats. This step is carried out before the implementation of the method of the invention. The images not having this format are then converted.

According to an alternative embodiment, the format is defined by default according to a predefined configuration.

According to another alternative embodiment, the format is chosen among a format of one of the images of the set ENS1, for example, as a function of:
the image of greatest size of the set ENS1 and/or;
the image of smallest size of the set ENS1 and/or;
a given position of an image chosen in the sequence SEQ1, for example the first image.

According to an embodiment, the chosen dimensions of the images of the set $ENS_1$ are determined as a function of the dimensions of a final image to generate and the number of images to extract.

According to an embodiment, the dimensions are determined as a function of a desired length/width proportion or of a length of diagonal.

According to an embodiment, a correspondence table includes data associating dimensions of printing support with given resolutions of images in pixels.

In this exemplary embodiment, this correspondence table makes it possible to define a format of images to apply to all the images of the set ENS1 as a function of a criterion of choice of printing support.

An advantage is, for example, to allow a user to choose the dimensions of a printing support and to force automatically the dimensions of the extracted images. The forced dimensions then make it possible to obtain a sufficient resolution at the moment of printing on the lenticular support.

According to an exemplary embodiment, the method may include:
a step aiming to verify that each image of the set ENS1 indeed has the same number $N_0$ of pixels P, if this is the case, the values of the densities of images $D_{im}$ are forced to the same value $D_{im}'$ to obtain the same sizes of images.

an enlargement or a reduction of the size of the images to the desired printing size. In this step, the number of pixels is not modified for each image. Hence, the density $D_{im}'$ of the images may, for its part, change into $D_{im}2$.

According to an embodiment, the method of the invention may include a step aiming to raise an alert when the density of the images modified in the redimensioning step is below a predefined threshold, for example 200 DPI. For example, this alert may be transmitted to the user in such a way as to sensitise said user that images of better definitions are preferable to continue the method.

Redimensioning: Adaptation to the Lenticular Support

The images that have been previously redimensioned by a first redimensioning are once again redimensioned to be interlaced.

This redimensioning may be seen as a second redimensioning that succeeds the first redimensioning. However, according to another embodiment, these redimensionings may be steps combined in a single step according to the choices of implementation of the algorithm for preparing a final image IF to generate. The set of redimensioning operations are integrated in a step noted REDIM.

The two redimensioning steps are described successively due to the fact that they functionally represent two different steps.

The second redimensioning makes it possible to generate an image of which the width and/or the height in pixels corresponds to a multiple of the pitch. It will be recalled that the pitch defines the number of lenses per unit surface area or length.

An interest is notably to define a density of pixels per unit surface area of the image that is compatible with the capacity of the printer and the lenticular paper chosen for the printing.

As an example, if the pitch=100 lenses per inch and that it is decided to interlace 8 images, each lens L must make it possible to address 8 pixels of the printed image according to the viewing angle.

It is possible to compute the resolution D of the final image that will be D=Pitch·NIE. According to the example defined above, D=800 pixels/inch would be obtained.

This resolution must consequently be compatible with a capacity of the chosen printer, and thus in this exemplary case of 800 pixels/inch minimum.

The second redimensioning thus makes it possible to define the images in a resolution D compatible with an operation of interlacing the number of extracted images NIE so that the final image can be compatible with a printing on a predefined lenticular support.

According to an exemplary embodiment, a printing format may be chosen of {6.2 cm×11 cm}, i.e. {2.4409 inch×4.3306 inch}.

If an image is defined according to the dimensions expressed in pixels of, for example, 720×1280, then the printing resolution of the image is 720/2.4409=295 PPI (pixels per inch).

From these data, it is then possible to compute the new width and the new length of each image to interlace so that the interlacing operation is compatible with the printing format and the pitch.

According to an embodiment, the redimensioning of the images of the set ENS1 can take into account the number of images to interlace, that is to say the number of extracted images NIE.

According to an embodiment, the method of the invention will make it possible to transmit information as regards the choice of the lenticular support, and more specifically the pitch criterion so that the printing is configured according to the number of interlaced images. This transmission may be carried out automatically as a function of the type of file $F_1$ and thus the number of images to extract.

At the end of the redimensioning step, the images generated are noted $IM\_REDIM_1$.

According to the example described in the preceding redimensioning, the second redimensioning aiming to prepare the interlacing step, may include:

The adaptation of the resolution of the image $D_{im}2$ as a function of the pitch PT in order to obtain a new resolution $D_{im}3$. This change of resolution is carried out while conserving the dimensions of images to interlace. The number No of pixels P is thus modified to $N_1$.

Interlacing

According to an embodiment, the method of the invention comprises an interlacing ENTRL of the images of the set ENS1. It will be recalled that the order ORD1 of the images in the sequence SEQ 1 is recorded and the images are numbered or indexed.

Figure 4:
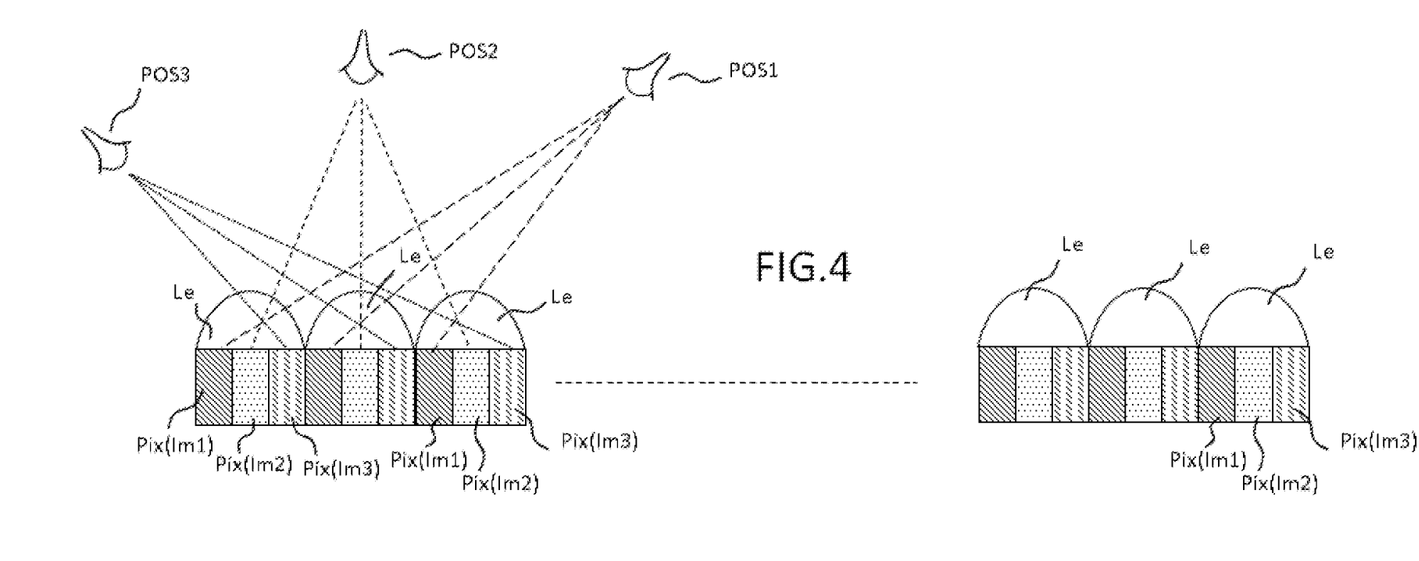
FIG. 4: an example of lenticular sheet printed by the method of the invention.

The interlacing is periodical, it makes it possible to associate with each pixel addressed by a lens L: one of the images of the set ENS1. Hence, the method of the invention ensures that each image of the set ENS1 comprises at least one pixel addressable by the lens L. The fact that the interlacing is periodical ensures that according to a given viewing angle, all the pixels of one of the given images of the set ENS1 are perceived. FIG. 4 represents the lenticular sheet on which are arranged the lenses L according to a certain pitch. The resolution of the printer makes it possible to have available an image on the lenticular support to form the lenticular sheet. Each lens L is capable thanks to the capacity of the printer to address 3 pixels.

A first position POS1 of an observer makes it possible to see an image of the lenticular sheet formed of pixels Pix(Im1) that are addressed by the lens according to the viewing angle of the observer.

The periodical interlacing makes it possible according to a given viewing angle to reform a complete image of one of the images of the set ENS1.

It is understood that by changing the viewing angle position, POS2, POS3, the observer accesses other images of the set ENS1.

A movement of the support or of the view thus makes it possible to animate a series of images so as for example to give them a movement.

The images are dimensioned such that 1 pixel width of the image corresponds to a fraction of the segmented image. The image is thus segmented according to the method of the invention into as many segments of 1 pixel which, placed end to end, correspond to the width of the image. According to other embodiments, the segments may have a width greater than 1 pixel, it is then necessary in this case to make the resolutions of images in adequation correspond with the definition of the width of a segment.

Figure 5A:
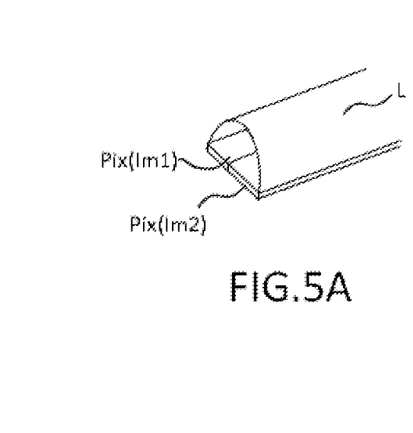
FIGS. 5A to 5C: different cases illustrating a lens arranged on a printing comprising an image, thus the interlacing of a number of images may be of 2, 3 or 8 images.
Figure 5B:
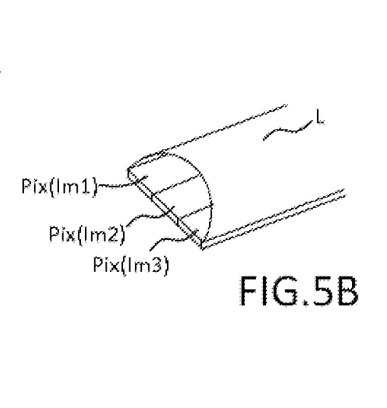
Figure 5C:
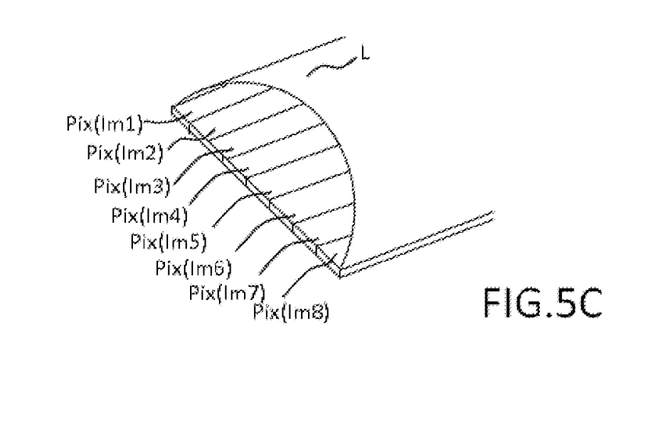

FIG. 5A represents the case where a lens L addresses two pixels of an image printed by the method of the invention. FIG. 5B represents an alternative in which the lens makes it possible to address three pixels of three different images. Finally, FIG. 5C represents the case where a lens L makes it possible to address 8 pixels of 8 different images. The pixels in each of the cases which are associated with given images are ordered according to a same sequence under each lens such that according to a given viewing angle, the observer views all the pixels of a same image.

By considering that there are N images in the set ENS1, the method of the invention makes it possible to ensure that each lens will address N pixels of the printed image according to the considered viewing angle on the lens.

Figure 3:
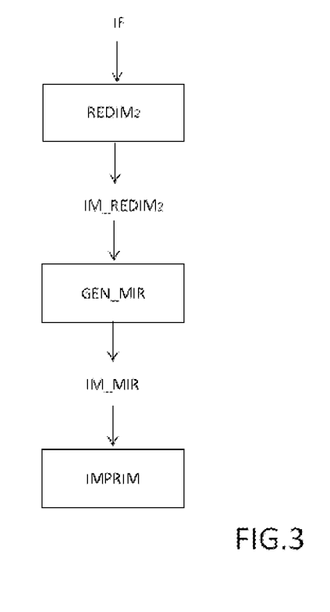
FIG. 3: an example of the steps of the method of the invention making it possible to generate a printing on a lenticular paper.

FIG. 3 represents 3 viewing angles making it possible to see three segments of three interlaced images addressed by a given lens.

The operation of interlacing ENTRL comprises a first step of cutting DEC a first image into a determined number of segments of identical dimensions and a step of ordering the cut segments of images to generate a final image IF. Advantageously, these two steps may be combined in a same operation thanks to a mask. According to an alternative, the images are digitally processed to extract the segments of interest and to combine the different extracted segments of each image to merge them according to an interlacing algorithm.

In an embodiment, the segments all have a width or a height of 1 pixel. According to an embodiment, the segments correspond to strips of given width and height corresponding to that of the segmented image. In another alternative embodiment, the segmentation may occur in the sense of the height and not the width of the image.

The segmentation of the images may be, for example, carried out from a mask. According to an exemplary embodiment, it is considered that the mask comprises at least one transparent stripe of 1 pixel width and the other stripes are black or opaque. The application of the mask on the image makes it possible to extract a segment of image of a width, or a height, of a pixel. The segment is extracted, numbered and recorded in a memory. The other pixels masked by the opaque stripes are not processed. The mask makes it possible on the one hand to extract a segment to interlace and to delete a part of the original image. Given the density of the images for example 300 PPI, that is to say 300 pixels per inch, the deletion of pixels of the image does not modify the visual effect for an observer.

According to an embodiment, the mask is generated as a function of the number of extracted images NIE in the set ENS1. The mask is then designed to extract a pixel of width or height of an image every NIE pixel of the image. A mask may thus include an alternation of transparent and opaque stripes. In the case of an interlacing of 8 images, the mask includes groups of stripes comprising a stripe of 1 transparent pixel and a stripe of 7 opaque pixels, the groups of stripes being juxtaposed to form a mask comprising a repeating pattern.

The mask may next be shifted in the sense of the width or the height according to the segmentation mode chosen when it is applied to a second image. The mask is thereby in succession shifted up to the final image to process of the set ENS1. In the case of a set ENS1 comprising 8 images, the mask is shifted 8 times to extract lines or columns of pixels of each image. The extracted lines or columns are next arranged one following the other in an adjacent manner to form a final image IF.

Generally speaking, the N first segments of each image in a group are grouped together in the order of the sequence SEQ1, then the set of segments N+1 to 2N of each image of the set ENS1 are grouped together and arranged in the continuity of the preceding segments following the same order.

According to another example, the segmentation of the images may be carried out from transparent rectangles applied on the image: this deletes the pixels under these rectangles.

The rectangles are created as a function of the size of the images and the NIE. They are placed periodically from an algorithm in order to leave a line (or a column) of a single pixel width between two rectangles. From one image to the next, in the order of the images, the rectangles are shifted by a pixel. The striped transparent images thereby obtained are finally merged with the other processed images with, as conditions:

transparent+transparent=transparent;

transparent+coloured pixel=coloured pixel.

This processing enables a placement of rectangles without there ever being two coloured pixels to merge.

Redimensioning for Printing

According to an embodiment, the final interlaced image IF obtained is next processed so as to take into account a given printing resolution. This step is noted $REDIM_2$ in FIG. 3.

The printing resolution may be such that several printing points encode a pixel of the image. The resolution of the image obtained by the method of the invention may thus be modified to be compatible with a given printing resolution.

As an example, a printing resolution may be 812.5 DPI, that is to say 812.5 printing points per inch. If an image comprises a resolution of 300 pixels/inch, each pixel will be encoded by 2 or 3 printing points. According to an embodiment, the method of the invention comprises a redimensioning step in order to prepare the file for the printing step. The image may be for example enlarged to correspond to the resolution of the printer.

In this operation, the method of the invention makes it possible to duplicate or delete pixels to adjust perfectly the image to the printing and to conserve the correct distribution of pixels per lens during printing.

On average, during the processing of duplicates and the deletion of pixels, the adjustment of the number of pixels per lens will be conserved.

In an embodiment, the printing resolution is chosen so as to be a multiple of the pitch. This case may be interesting for printers having a capacity of adapting their printing resolution. An interest is to configure the printing resolution on the value of the pitch which is liable to change according to the lenticular paper chosen and according to the number of images to print.

The image obtained at the end of this step is noted $IM\_REDIM_2$ in FIG. 3.

Mirror Image

In order to prepare the redimensioned image for printing, the method of the invention makes it possible to turn over the image, that is to say to generate the mirror image IM_MIR of the image obtained so as to enable printing on the back of the lenticular support. This operation GEN_MIR makes it possible to view the image according to the correct symmetry when a user observes the image through the network of lenses.

The turning over of the image by the generation of a mirror image may alternatively be carried out before the step of interlacing or instead during the redimensioning steps.

The mirror image is next transmitted to a printer IMPRIM for the printing thereof. The interlacing notably makes it possible to print an image on a lenticular paper making it possible to offer to a user a visual change of the image according to the viewing angle. This effect, better known by the acronym FLIP, makes it possible to transpose a digital animated file automatically onto a physical support.

Printing Indicator

According to an embodiment, a user activates the generation of printing by downloading or by processing locally a video file or a set of images. According to an embodiment, the method of the invention makes it possible to pool the generation of a plurality of final images by the downloading or by the processing of a plurality of video files or a set of images.

When a plurality of first files $F_1$ are processed, the method makes it possible to generate a printing indicator aiming to organise the printing of the final images on a same lenticular sheet when it is of greater size than the dimensions of a final image.

According to an embodiment, the printing indicator includes information relative to a same command number of the set of final images of a same user. According to another embodiment, the indicator further includes information relative to the number of interlaced images of each final image to generate.

According to an embodiment, the method of the invention includes a step aiming to decide on a pooled printing or not of several final images on a same printing support as a function of the previously described criteria. The printing indicator may be generated and transmitted to a printer connected to a network or co-localised to a server or instead to a terminal when the method is executed locally on the terminal.

This printing indicator makes it possible to group together final images having a same number of interlaced images in the final image to be printed on a lenticular paper having a given pitch.

During printing, the final images are arranged per lenticular sheet as a function of the identifier of the user and as a function of the pitch of the sheet.

According to an exemplary embodiment, the user chooses a size and proportions of the printing supports on which the final interlaced images coming from each file $F_1$.

In order to make the files $F_1$ correspond with the dimensions and the ratio of the printing supports, the method of the invention includes steps making it possible to manage the transformations of the files according to their dimensions, their proportion, their type, etc.

Each file $F_1$ is then:
  either processed locally on a computer, a tablet or a smartphone then transmitted with the correct dimensions and proportions to the server;
  or downloaded on a server then modified once recorded on the server. The method next includes steps aiming to generate a file with the correct proportions and with the correct dimensions. In this case, the parameterisation is transmitted to the server so that the calculator and the memory of the server can execute the modifications of the images or the videos.

This operation may be performed for each file $F_1$, one after the other independently or conjointly by defining an identical size and proportions for each file $F_1$.

As an example, a user has the choice of selecting a size and a ratio of support printed by means of a graphic interface. This may be pre-selected among a proposed list or instead defined in an input field. The ratio of the image, that is to say the width/length proportions, are parameterizable according to the format of the chosen support/paper. For example, a user can order small stickers at the ratio 16:9 or standard photos in 10 cm by 15 cm.

According to an embodiment, the user chooses the size and the ratio, that is to say the proportions of the support that he wishes to print, by means of a user interface. In this case, a type of lenticular paper is associated with each support chosen, in particular the chosen type of lenticular paper comes down to determining the number of lenses per unit of length or surface area, that is to say the pitch. As an example, a paper format may be: 20 Lpi, 40 Lpi, 50 Lpi, 62 Lpi, 75 Lpi, 100 Lpi, 150 Lpi. It will be recalled that "Lpi" designates the number of lenses per inch.

According to an embodiment, the format of the lenticular paper next imposes the value of the parameter $NIE_{max}$. According to an exemplary embodiment, the computation of the parameter $NIE_{max}$ may be computed by computing the rounded down of the ratio between the printing resolution and the pitch. It is recalled that the printing resolution is noted DPI and that it is defined by the printer or its configuration. DPI designates "dots per inch".

$$NIE_{max} = \lfloor DPI/Pitch \rfloor$$

According to an embodiment, when the user has defined a printing format, he can select one or more digital contents of his choosing in the format of his choosing. The formats may be, for example, video formats (.avi, .mp4, etc.), formats of "Live Photos", "Boomerangs", "Gif" type, and even standard photos in a given format, such as .jpg, .png, etc.

According to an embodiment, whatever the chosen formats for the selected files $F_1$, the method of the invention makes it possible to convert each input file $F_1$ into a video format.

According to an embodiment, the user next selects a portion of the video that has just been converted. The method of the invention thereby makes it possible to select a short duration of the video coming from each file $F_1$. As an example, the user can select a second, "1 s", of video within the total duration of the video. An advantage is to obtain a clear and precise movement effect when the generated image will be printed on the lenticular support. Thus, an advantage of the invention is to preselect predefined durations already optimised for the chosen support. According to an example, the predefined durations are associated and proposed as a function of the pitch of the papier. The method of the invention thus makes it possible to avoid printing errors, poor renderings or printings of too poor quality adversely affecting the quality of appreciation of the movement generated by the effect of interlacing the images.

According to different embodiments, the suggested durations are less than a maximum duration. As an example, the user can select a duration less than 2 s. An optimal rendering may be obtained for a video sequence duration less than 1 s. The file thereby reduced is noted $F_1'$. If the duration of the file $F_1$ is less than 2 s or than 1 s, then the method of the invention does not propose a step aiming to reduce the video. According to an embodiment, the extracted video portion has a duration comprised between 0.5 s and 1 s, for example 0.7 s for which the dynamism of the animation of a final image is optimised with $NIE_{max}=8$.

According to an embodiment, the method of the invention makes it possible to deliver an interface in which a user views the converted video and can select a start and an end of the selected portion. According to an embodiment, he can handle time markers in order to determine precisely a start and an end of the file $F_1'$.

According to an embodiment, when the file $F_1$ comprises images and not a video, the user is invited to select the images that he will retain from the file $F_1$.

According to an embodiment, the method includes, for each file $F_1$ having been transformed into a video file in a predefined format, a step of selection of images to interlace them and to print them on a support.

For each file $F_1$ or a computation of the number of images to extract from the video is carried out. The method makes it possible to compute the $NIE_{max}$ automatically and generates a selection of all the images of the file $F_1$ or if the number of images is less than the value of $NIE_{max}$.

In this case, according to an exemplary embodiment, the method includes a step in which a processing means carries out a duplication of the extracted images in order to reach the value of $NIE_{max}$. According to an embodiment, the method includes an algorithm making it possible to duplicate in priority images at the ends of the file $F_1$ or in order to reach a number of extracted images equal to the value of $NIE_{max}$. The images at the ends of the file $F_1$ or are, for example, the first image and the final image. The method thus includes a function making it possible to calculate automatically the number of images to extract and to compare it with $NIE_{max}$ in order to adjust this number to the value of $NIE_{max}$.

If the number of images of the file $F_1$ is greater than the value of $NIE_{max}$, a selection of images is extracted automatically according to a predefined algorithm so as to limit the number of images selected to $NIE_{max}$. The algorithm may be for example an even distribution of the images on the set of images of the file $F_1$ or $F_1'$ or instead a random selection, etc. According to an example, the number of selected images is chosen equal to $NIE_{max}-2$ such that the images at the ends of the file are duplicated. This signifies that the first and the final image will be duplicated in order to obtain good rendering during printing. In all, there will thus be: $NIE_{max}-2+2$ images$=NIE_{max}$ images in the final file that will be interlaced in this example.

According to an embodiment, the images are cut to reach the selected ratio and/or format. In this case, the method of the invention may provide to generate an animated preview of the rendering that will be printed. The method of the invention thus makes it possible to simulate the animation of the final image in a digital manner. The animation is obtained by a simulation carried out on a digital image in which the different animated images are displayed one by one thanks to filters making it possible to restore the interlacing effect of the lenticular support. A filter may include, for example, a means for generating white or black pixels in order to create phantom columns in the final simulated image.

This rendering enables a user to validate the printing. According to an embodiment, the method comprises the generation of an interface making it possible to propose an automatic selection of images, for example spontaneously or after an invalidation of the user concerning a first selection or a first simulation. According to an embodiment, the method of the invention generates a plurality of selections of images which may be rapidly viewed and optionally simulated to offer to a user a previewing tool. In order to generate automatically these pre-selections, the method includes for example a selection of portions of videos of different durations according to the downloaded file $F_1$. According to an example, the method generates a selection of extracted images of the video in which the spacings between the images are predefined according to a value dependent for example on the pitch and/or the length of the video.

According to an example, a selection of a duration of 0.5 s, 1 s, 1.5 s and 2 s may make it possible to propose to a user four different renderings which may be possibly previewed by said user. The user may then validate the final image that will be printed on the lenticular paper.

In another embodiment, the method includes the generation of a selection tool enabling a user to validate or to modify the extracted images of a selection.

According to an embodiment, the method of the invention makes it possible to generate a library of animations of which the number of images is adapted to the $NIE_{max}$ that has been computed. In this case, an interest is to superimpose on each selected image of the file $F_1$ or $F_1'$ another image of a second animation. An advantage is to generate a lenticular support comprising two concomitant or superimposed animations.

In the case of files $F_1$ or $F_1'$ comprising photos, the method makes it possible to generate an animation, for example a gif animation, by superposition of an animation produced by the interlacing of photos according to the method of the invention. In the case where a file $F_1$ or $F_1'$ only comprises a single photo, an interface makes it possible to superimpose on the photo an animation, for example gif, the animation of the gif being produced by the interlacing of different images each comprising a combination of the photo and an extracted image of the .gif. An advantage is to give the user the possibility of producing animated stickers on his photo.

According to an embodiment, the method comprises a library of animations of which the colour and the animation are determined as a function of the analysis of the colours of the images of the downloaded file $F_1$ or $F_1'$ and the dimensions and the size of the files. For the colour, a colorimetric filter may be applied.

In this embodiment, the method makes it possible to merge and to convert images coming from two different files by applying the same transformations in size and in proportion of image. Each new image of the selection resulting from the preceding merger that will be interlaced then comprises a superposition of images. This effect makes it possible to coordinate two animations into a single animation.

In an embodiment in which the first file $F_1$ or includes several images/photos, for example comprising different formats, the method of the invention makes it possible to generate an interface enabling the user to select a determined number of images/photos. The method includes a function for controlling the number of selected images in order to guarantee that this number is less than or equal to $NIE_{max}$.

According to an example, the method comprises a generation of an automatic preview of the photos of a same file $F_1$. In an exemplary embodiment, the photos are cut and redimensioned after validation of the preview.

In a first example, a user wishes to use the method of the invention with three files $F_1$. In this example, the first file $F_1$ is a video of .avi format, the second file $F_1$ is a Boomerang type file, the third file $F_1$ is a file comprising photos.

It is assumed in this example that the first file $F_1$ comprises a video of .avi format of a duration of 10 s. In order to offer good animation rendering, the method of the invention makes it possible to reduce the portion of video that will be treated to generate interlaced images with an appreciable dynamic. The method of the invention then makes it possible to generate an interface making it possible to select a portion, for example of a second of the first file $F_1$. The method of the invention makes it possible to generate a preview of this portion, the preview comprises a selection of extracted images of this portion of video. An editing window makes it possible to modify the choices by default which are proposed. The method can replay a simulation at each new modification until the user is satisfied with the chosen images. In an embodiment, the modifications are made locally or on an intermediate server. The selected images are then transmitted to a remote server that is going to generate the final image. If the video is not in the same ratio as the printed format, the extracted images will be cut to the correct dimensions and to the correct proportions.

The second file $F_1$ of boomerang type is processed by only considering the totality or half of the duration of the file $F_1$. Indeed, a boomerang file is a "forwards-backwards" video: a movement is captured, then mounted the wrong way round in order to have a "come and go" effect on viewing.

According to a first example, the method of the invention assimilates the boomerang file with a video file and processes it as such. In a second example, the boomerang file is loaded whole on the remote server. Then a calculator of the server analyses the content of the boomerang type file in order to extract the "forward" part of the movement. From this video are extracted the images to interlace.

The third file $F_1$ of images comprising for example 10 good resolution images is processed from the calculator of the remote server. The method of the invention makes it possible to verify that the number of images is less than or equal to $NIE_{max}$. If this is not the case, a selection of images is extracted from the 10 proposed. The calculator next verifies that all the images are in the same format and same ratio, and that this format is compatible with the desired printing format. If this is not the case, the images are cut and redimensioned.

In a second example, a user uploads onto a remote server a plurality of files $F_1$, of which:
  a first video file $F_1$ of Live Photo type, which is a video encoded with a compression format H.264 or MPEG-4 AVC (Advanced Video Coding) or MPEG-4 Part 10;
  A second video file $F_1$ of Boomerang type;
  A third video file $F_1$ of .gif type.

In these cases, the three files $F_1$ are converted into video. For each video, the user selects a part of the video, corresponding to a portion thereof. The method makes it possible, for example, to extract a number of photos of this portion automatically. Each photo of the selection may be validated or invalidated by the user. It is from this selection that the interlacing operation will make it possible to print a final image on a lenticular support. For each file, an optional step of cutting the images/photos and/or redimensioning makes it possible to render compatible the final image with the dimensions and the portions of the chosen support.

Generally speaking, when a plurality of video files forming as many files $F_1$ with possibly different durations are downloaded, for each file, the method automatically selects a portion of a preconfigured duration of the video. In an embodiment, the user can himself determine the portion of the video. The latter may be suggested by an algorithm as mentioned previously.

An advantage is to only transmit the part of the video that has been selected on a remote server, thereby limiting processing times.

According to a third example, if the user wishes that the method processes three files $F_1$ of which two comprise different numbers of images, such as 4 images and 10 images and a third file $F_1$ of which the images are of poor resolution.

By assuming that a choice of printing support imposes an $NIE_{max}=8$, then the method will process, with thus:
  The calculator will select 8 images of the file comprising 10 images, for example by deleting the two extremal images of the first file $F_1$. The user will then be able to validate or to modify the proposition that is made. Another algorithm could for example choose a random selection of images.
  The file would duplicate all the images of the file comprising 4 images in order to obtain a $NIE_{max}$ of images equal to 8. In another case, the method would conserve 4 images and would process the 4 interlaced images on a support comprising a pitch different from the first file $F_1$, which signifies reducing the $NIE_{max}$ for this file and adapting the correct paper support that corresponds thereto. The method may include an interface making it possible to leave the choice between the two options to the user.
  For the third file $F_1$, the method may include a function for controlling the resolution which makes it possible to generate an alert for the user by means of the user interface when the resolution is judged too low to guarantee minimum quality. The user is then able to choose if it is indeed the file $F_1$ that he wishes to exploit. This control also exists for the resolution of a video.

An advantage of the method of the invention is thus to make it possible to process different types of files in order to automate everything while leaving freedom to the user to be able to parameterise the settings before validating the printing.

According to an embodiment, a plurality of printers each with a printing configuration are referenced in a memory, for example the memory of a server. According to this embodiment, the method of the invention is able to extract each printer configuration in order to compute the $NIE_{max}$ for each of the printers. If a printer has several possible configurations such as for example a parameterizable resolution or different trays having supports of different dimensions then the memory can record the different configurations of each of the printers.

According to an example, the method recognises 3 printers, of which two have a printing configuration: CONFI_1, CONFIG_2. The two configurations respectively make it possible to obtain respectively two different values of $NIE_{max}$, i.e. $NIE_{max}=4$ and $NIE_{max}=8$. The third printer includes two configurations possibly activatable remotely, the first CONFIG_3 makes it possible to obtain a $NIE_{max}$ of 8 and the second configuration makes it possible to obtain a $NIE_{max}$ of 10.

In this case, the method of the invention comprises a step making it possible to interrogate the number of possible configurations, to identify them, to test optionally the presence of the printer and to generate within a user interface a menu making it possible to select the most suitable configuration. If the user has a certain number of photos, this makes it possible to choose automatically the best printer or the best configuration of a printer to generate automatically a printing as a function of the most suitable $NIE_{max}$. The network address of the chosen printer is then exploited in the method of the invention for addressing the files $F_1$ with a same printing configuration. In this case, the printing configuration may be recalled in the data exchanged between the processor/calculator carrying out the steps of the method and the printer carrying out the printing.

This case may be generalised with N printers, P configurations per printer and K files $F_1$, with N, P, K natural numbers of which the limit is set by the means implemented for executing the method of the invention

The invention claimed is:

1. Method for generating a plurality of final images for printing thereof on at least one lenticular support, the method comprising:
   receiving a plurality of first files, each first file comprising a given format, size and number of images, each first file further being associated with a user and with a given printing configuration, for each reception of a first file, the method includes:
   performing an automatic extraction of a determined number of images of the first file as a function of a maximum number of images to extract, said images being ordered according to a first order;
   performing a redimensioning of the images as a function of a parameter of density of lenses per unit surface area of the lenticular support, and dimensions of the lenticular support;
   performing a periodical interlacing generating an image formed of an alternation of segments of pixels coming from the extracted images of the first file;
   performing an automatic generation of as many final images as first files received in order to be printed on at least one lenticular support.

2. The method according to claim 1, wherein the printing configuration comprises at least one of the elements among the following list:
   a value of a number of images to extract (NIE) selected by a user or of a type of format of the first file automatically inducing a predefined number of images to extract (NIE);
   a density of lenses per unit surface area of the lenticular support and/or;
   a density of printing of points per unit of length and/or;
   dimensions, comprising at least one given size and one proportion, of the support chosen for the printing.

3. The method according to claim 1, wherein the maximum number of images to extract (NIE.sub.max) is deduced from first configuration.

4. The method according to claim 1, wherein the maximum number of images to extract is determined as a function of: a parameter of density of lenses per unit surface area, noted pitch, and printing resolution.

5. The method according to claim 1 wherein a first type of video format is a format comprising a predefined duration.

6. The method according to claim 1, wherein the first file comprising a plurality of images is a file among the following list:
   a video file of predefined duration;
   a file in Gifs format;
   a file of animated images of LivePhoto type;
   a video file of Boomerang type;
   a set of images.

7. The method according to claim 1, wherein when at least one file is a video file, the method comprises of generating an extract of a portion of the video less than 2s and performing an automatic extraction of said portion of a number of images corresponding to the value of the maximum number of images to extract.

8. The method according to claim 1, further comprising:
   performing a plurality of acquisitions of first files simultaneously and;
   performing steps of extraction, redimensioning and interlacing for each of the first files acquired in an independent manner.

9. The method according to claim 1, further comprising computing a volume of data to process or a number of files received so as to allocate dynamically computing resources necessary to process a plurality of first files simultaneously.

10. The method according to claim 1, further comprising generating a printing indicator in order to group together the first files received having a same number of extracted images (NIE) to be printed on a same support of larger dimension than that of the printed image, a cutting step being carried out in order to generate the final image.

11. The method according to claim 1, further comprising generating a printing indicator in order to group together the first files received having a same user identifier.

12. The method according to claim 1, wherein the format and dimensions of each image are automatically homogenised with each other as a function of at least one predefined criterion.

13. The method according to claim 1, wherein a redimensioning of the images generates a width and/or a height of each image of a set of extracted images such that it corresponds to the dimensions of the lenticular support, density of redimensioned images being computed to correspond to multiple pitches.

14. A non-transitory computer readable medium of a digital device, including software code instructions for an execution of the steps of the method according to claim 1 when said instructions are executed on the digital device.

15. The non-transitory computer readable medium according to claim 14 wherein the digital device is a PC, a server or a mobile terminal.

16. Device for an implementation of the method of claim 1, comprising a memory for recording the extracted images and a calculator for carrying out the steps of redimensioning and interlacing processed images.

17. The device according to claim 16, further comprising storage and computing resources adaptable to a volume of data of first files acquired within a given time lapse.

\* \* \* \* \*